United States Patent
Kulkarni et al.

(10) Patent No.: US 8,558,862 B2
(45) Date of Patent: Oct. 15, 2013

(54) VIDEOCONFERENCING USING A PRECODED BITSTREAM

(75) Inventors: Hrishikesh G. Kulkarni, Bangalore (IN); Ashish Goyal, Bangalore (IN); Hitesh Chouhan, Bangalore (IN); Raghuram Belur, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 298 days.

(21) Appl. No.: 12/890,177

(22) Filed: Sep. 24, 2010

(65) Prior Publication Data

US 2011/0074913 A1 Mar. 31, 2011

Related U.S. Application Data

(60) Provisional application No. 61/246,377, filed on Sep. 28, 2009.

(51) Int. Cl.
*H04N 7/14* (2006.01)
(52) U.S. Cl.
USPC ........................................ 348/14.01; 725/106
(58) Field of Classification Search
USPC .................... 348/14.01–14.11; 370/382, 352; 709/204, 224, 246
See application file for complete search history.

(56) References Cited

U.S. PATENT DOCUMENTS

| | | | |
|---|---|---|---|
| 7,356,080 B2 | 4/2008 | Lee et al. | |
| 7,388,913 B1 | 6/2008 | Christopoulos et al. | |
| 7,454,692 B2 | 11/2008 | Bhaskaran | |
| 7,692,683 B2 | 4/2010 | Kenoyer et al. | |
| 2005/0036659 A1* | 2/2005 | Talmon et al. | 382/103 |
| 2006/0037052 A1* | 2/2006 | McDowell et al. | 725/80 |
| 2006/0087553 A1 | 4/2006 | Kenoyer et al. | |
| 2006/0158509 A1 | 7/2006 | Kenoyer et al. | |
| 2006/0248210 A1 | 11/2006 | Kenoyer | |
| 2007/0263072 A1* | 11/2007 | Lochbaum et al. | 348/14.08 |
| 2008/0316295 A1 | 12/2008 | King et al. | |
| 2009/0239522 A1* | 9/2009 | Rek | 455/422.1 |
| 2010/0225736 A1 | 9/2010 | King et al. | |
| 2010/0231556 A1* | 9/2010 | Mines et al. | 345/173 |
| 2011/0058607 A1* | 3/2011 | Zhao | 375/240.12 |

* cited by examiner

*Primary Examiner* — Maria El-Zoobi
(74) *Attorney, Agent, or Firm* — Meyertons Hood Kivlin Kowert & Goetzel, P.C.; Jeffrey C. Hood; Joel L. Stevens

(57) ABSTRACT

Sharing computer video in a videoconference. The method may include acquiring video on a computer. The method may also include coding the acquired video on the computer. Transmitting the coded video from the computer to a videoconferencing unit may also be included in the method. Also, the method may include packaging the transmitted video coded on the videoconferencing unit. Furthermore, the method may include transmitting the packaged video to a videoconferencing destination.

20 Claims, 4 Drawing Sheets

VIDEOCONFERENCING USING A PRECODED BITSTREAM

PRIORITY

This application claims benefit of priority of U.S. Provisional Application Ser. No. 61/246,377 titled "Videoconferencing Using a Precoded Bitstream", filed Sep. 28, 2009, whose inventors were Hrishikesh G. Kulkarni, Ashish Goyal, Hitesh Chouhan, and Raghu Belur, which is hereby incorporated by reference in its entirety as though fully and completely set forth herein.

FIELD OF THE INVENTION

The present invention relates generally to video conferencing and, more specifically, to a method for sharing computer video in a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to other (remote) participant(s). Each videoconferencing system may also include a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference). In some videoconferencing systems a computer (e.g., a personal computer (PC)) may be connected to videoconferencing equipment and used for a variety of purposes (e.g., for displaying and/or modifying documents).

Similarly, audioconferencing (e.g., teleconferencing) may allow two or more participants at remote locations to communicate using audio. For example, a speakerphone may be placed in a conference room at one location, thereby allowing any users in the conference room to participate in the audioconference with another set of user(s) (e.g., in another conference room with a speakerphone).

In some videoconferencing situations (e.g., data conferencing) a PC may be employed (e.g., for the display of data, for the modification of data). Many modern PCs are powerful machines able to perform a wide variety of tasks. With appropriate software, many PCs may be capable of performing tasks that may be beneficial for videoconferencing. For example, by utilizing the capabilities of a computer, computer information to be shared by videoconferencing may be handled in a beneficial manner. Accordingly, it is desirable to have a method for using a computer (e.g., a PC) to enable improved videoconferencing solutions.

SUMMARY OF THE INVENTION

Various embodiments are presented of a system and method for sharing computer video data in a videoconference.

The method may include acquiring video on a computer. In some embodiments, acquiring video on the computer may include acquiring video corresponding to a software application display window.

The method may also include coding the acquired video on the computer. Coding the acquired video on the computer may include coding the acquired video in a manner that is fully compatible or substantially compatible with the videoconference, and coding may also include fully coding the acquired video. In some embodiments, coding the acquired video on the computer may include coding the acquired video in a manner that is compatible with a communications protocol. In some embodiments, coding the acquired video on the computer may include coding the acquired video in a manner that is compatible with videoconferencing standard International Telecommunication Union Telecommunication standard (ITU-T) H.239. Similarly, in some embodiments, coding the acquired video on the computer may include coding the acquired video in a manner that is compatible with Session Initiation Protocol (SIP), although other embodiments and protocols are envisioned.

In some embodiments, the coded video may be transmitted from the computer to a videoconferencing unit. In one or more embodiments transmitting the coded video from the computer to the videoconferencing unit may include transmitting the coded video from the computer to the videoconferencing unit across a computer network. Transmitting the coded video from the computer to the videoconferencing unit may also include transmitting the coded video from the computer to the videoconferencing unit across a Transmission Control Protocol/Internet Protocol (TCP/IP) network. According to some embodiments, transmitting the coded video from the computer to the videoconferencing unit may include transmitting the coded video from the computer to the videoconferencing unit across a peer-to-peer wireless link. In some embodiments, transmitting coded video from the computer to the videoconferencing unit may include transmitting coded video from the computer to the videoconferencing unit via a wireless access point. Transmitting the coded video from the computer to the videoconferencing unit may involve transmitting the coded video from the computer to the videoconferencing unit across an Institute of Electrical and Electronic Engineers (IEEE) 802.11 wireless network. Furthermore, transmitting the coded video from the computer to the videoconferencing unit may involve transmitting coded video from the computer to the videoconferencing unit across an IEEE 802.11 wireless network via a wireless access point.

Where necessary, the transmitted, coded video may be packaged on the videoconferencing unit. However, where fully coded video data (in the correct packaging/format for the videoconference) is provided, packaging by the videoconferencing unit may not be necessary.

Finally, the method may include transmitting the packaged video to a videoconferencing destination, e.g., over a network, such as the Internet.

BRIEF DESCRIPTION OF THE DRAWINGS

A better understanding of the present invention may be obtained when the following detailed description is considered in conjunction with the following drawings, in which.

Figure 1:
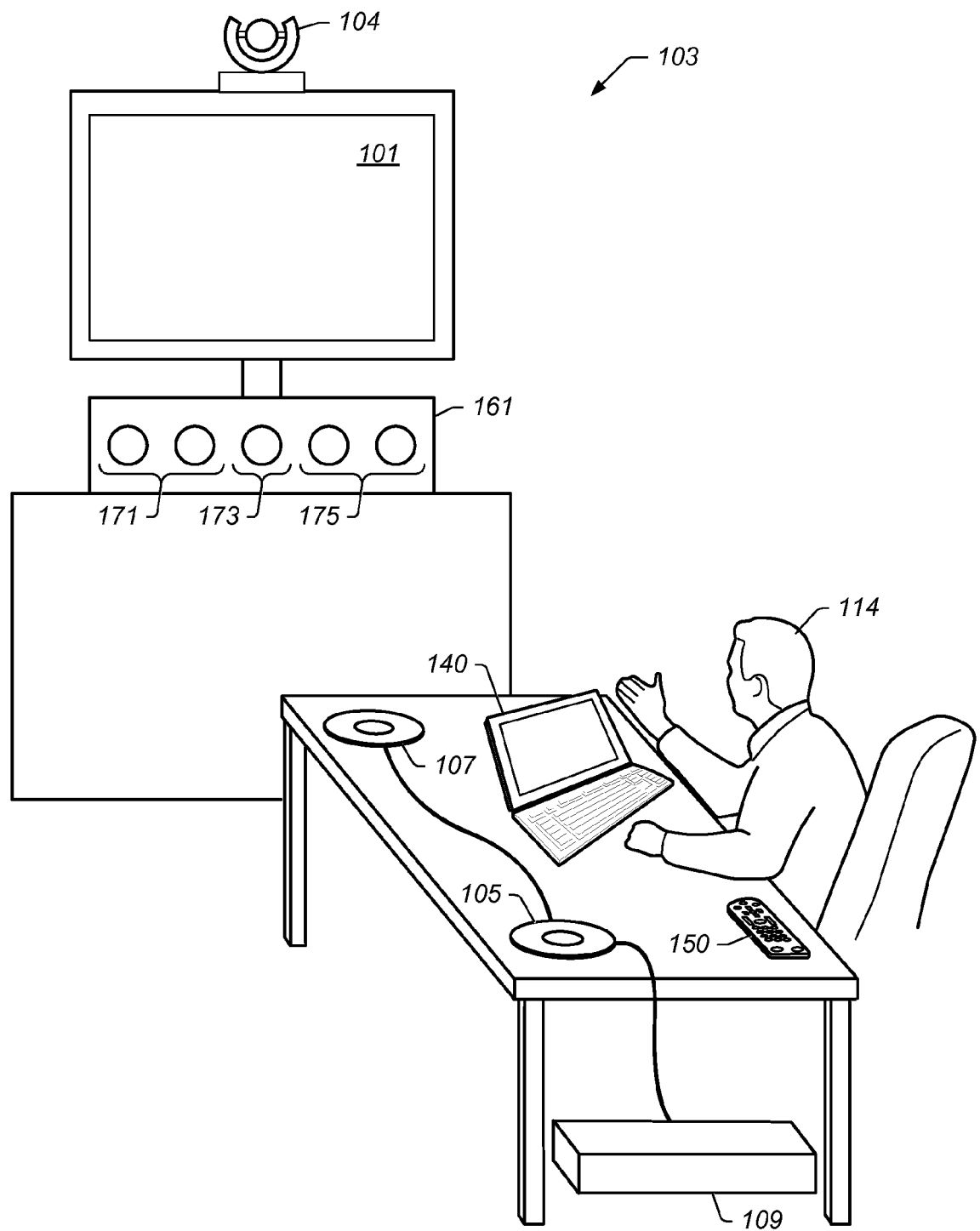
FIG. 1 illustrates an exemplary videoconferencing system participant location, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

FIG. 1—Exemplary Participant Location

FIG. 1 illustrates an exemplary embodiment of a videoconferencing participant location, also referred to as a videoconferencing endpoint or a videoconferencing system (or videoconferencing unit). Videoconferencing system 103 may include system unit 109, e.g., a videoconferencing codec (e.g., a coder-decoder). Note, however, that videoconferencing system unit 109 may provide various other functions, including, for example, non-codec functions. However, for reasons of brevity, videoconferencing system unit 109 may be hereafter referred to as codec 109. In some embodiments, codec 109 may manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as a keyboard (not shown) or a mouse (not shown). In some embodiments, the one or more input devices may be used for the videoconferencing system 103 and/or may be used for one or more other computer systems at the participant location, as desired.

In some embodiments, the participant location may also include a computer system 140 (e.g., a PC 140). The computer system 140 may be used for multiple purposes (e.g., viewing and modifying documents for data conferencing). The computer system 140 may be of various types (e.g., desktop computer, laptop computer, net-book, server, workstation) and it may run a variety of operating systems (e.g., Microsoft Windows®, Mac OS®, Linux®, Solaris™). The computer system 140 may also be able to provide (e.g., through software applications running on the computer) functions that may be beneficial to the video conferencing system. For example, the computer system 140 may be able to perform tasks that may otherwise be performed by videoconferencing equipment (e.g. codec 109). Also, through the use of software (e.g., software running on the computer system 140), transmitting data may be performed in a more beneficial manner (e.g., data may be converted for transmission and transmitted using different techniques). Furthermore, it may connect to videoconferencing equipment in a number of ways (e.g., wired connection, wired network connection, wireless peer-to-peer connection, wireless infrastructure connection).

In some embodiments, the computer system 140 may employ an application (e.g., Virtual Network Computing (VNC)) to acquire (e.g., screen grab) one or more images (e.g., a graphical user interface (GUI) image, a GUI window image, a desktop application image) or video (e.g., video displayed on the computer, presentation video, video corresponding to a computer application). Hereafter, the term video may be used to describe various types of image information, including for example, a sequence of images at various resolutions and frame rates. The computer system 140 may then code the video (e.g., encode, partly encode, code according to a specific method or standard, compress), and it may use an application (e.g., VNC) to do so. The computer system 140 may then transmit (e.g., by a wired connection, by a wireless connection) the uncompressed (or compressed) video to codec 109 (e.g., via a wireless router, directly). Codec 109 may then transcode (e.g., convert one digital coding format to another, compress the images for videoconferencing, decode and then encode in a different manner) the video data, then package the video (e.g., convert to a packaged bitstream) and transmit the images according to a suitable videoconferencing convention (e.g., a videoconferencing standard, a multimedia sharing convention, International Telecommunication Union Telecommunication standard (ITU-T) H.239, SIP, among other possibilities).

In some embodiments, the computer system 140 may run other software or other applications (e.g., open source applications) that may include, for example, the VideoLan Client (VLC) written by the VideoLan project. VLC is a portable media player, encoder and streamer that supports many audio and video coding schemes. In some embodiments, the computer system 140 may use an application (e.g., VLC) or other suitable software to code video (e.g., substantially compress, substantially encode, fully compress, fully code, substantially or fully process according to a compatible videoconferencing convention) and to stream (e.g., using a wireless connection, using a network connection) a coded bitstream to a videoconferencing unit (e.g., codec 109). Codec 109 may then perform some additional processing (e.g., supplementary processing, format adjustments) and package the precoded (e.g., coded on the computer system 140) bitstream into a suitable format (e.g., a video conferencing format, a standard format, a recognized format, a multimedia communications format, ITU-T H.239) for videoconferencing use. Then codec 109 may transmit the coded video bitsteam to another videoconferencing unit or MCU via the Internet and/or an intranet and/or an extranet.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., camera 104, display 101, sound system 161, and speakerphones 105/107) may be coupled to system codec 109. System codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. System codec 109 may also receive video data from camera 104 (and the computer system 140) and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as a keyboard (not shown) and/or the computer system 140 and/or remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with various network infrastructures that may include, for example, network infrastructures that support T1 capabilities or less (e.g., 1.5 mega-bits per second or less, 2 mega-bits per second or more, etc.). Note that these network infrastructures are purely exemplary and are not intended to be limiting in any way. Those familiar with the art will appreciate that some embodiments may operate with network infrastructures that have greater capabilities and that other embodiments may operate with network infrastructures have lesser capabilities.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a GUI on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 may be modified to be an audioconferencing system. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems).

Figure 2:
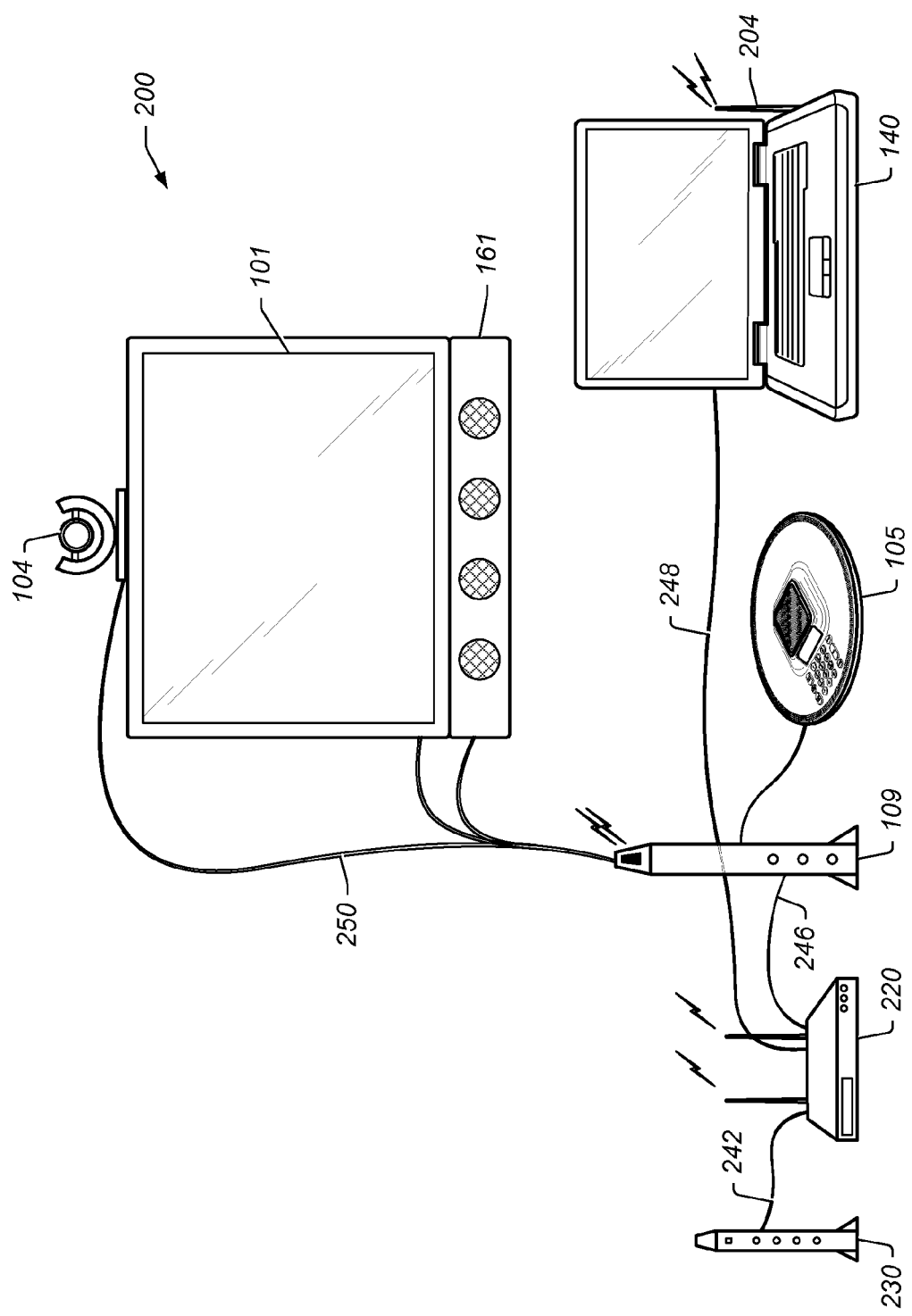
FIG. 2 depicts the components of an exemplary conferencing system, according to one or more embodiments.

FIG. 2—Exemplary Videoconferencing Components

FIG. 2 depicts an exemplary videoconferencing system 200 according to one or more embodiments. In FIG. 2 videoconferencing components and wired connections between the components are depicted. Videoconferencing system 200 includes many of the same components found in system 103. For example, system 200 includes the computer system 140, codec 109, speakerphone 105, camera 104, display 101 and sound system 161. Since these components (and their uses) have already been described in text accompanying FIG. 1, other aspects of system 200 will now been addressed.

System 200 may include network router 220, which may be a wireless router or a wired router or a wireless/wired router (as depicted). Router 220 may connect to codec 109 by cable 246 and to the computer system 140 by cable 248. If router 220 is a wireless/wired router then router 220 may, for example, connect to the computer system 140 by a wired link or by a wireless link and router 220 may, for example, connect to codec 109 by a wired link or by a wireless link.

Router 220 may also connect to modem 230 (e.g., through cable 242) which may enable videoconferencing system 200 to connect to the Internet and/or an intranet and/or an extranet. Modem 230 may be, for example, an asymmetric digital subscriber line (ADSL) modem, an integrated services digital network (ISDN) modem, a cable modem or some other type of modem.

Depicted system 200 may have other wired connections. For example, codec 109 may connect to display 101, camera 104 and sound system 161 by cables 250. In some embodiments (e.g., in depicted videoconferencing system 200) the computer system 140 may connect to codec 109 in a wide variety of fashions. For example, the computer system 140 and codec 109 may both reside on a same network (e.g., a local area network (LAN), a wide area network (WAN)) and may communicate with each other across the network. The network may a wireless network, for example, a wireless network conforming to an Institute of Electrical and Electronic Engineers (IEEE) wireless standard (e.g., IEEE 802.11x, such as 802.11g or 802.11n). The codec 109 and the computer system 140 may reside on an IEEE 802.3 "Ethernet" network and wired connections may be made, for example, by co-axial cable, twisted pair or optical fiber. The network may support various protocols including, for example, transmission control protocol/ internet protocol (TCP/IP). The computer system 140 and codec 109 may connect by other means (e.g., a Bluetooth wireless connection, a direct wired connection, etc.).

The computer system 140 and codec 109 may be connected, across a network, in a variety of ways. For example, the computer system 140 and codec 109 may form an ad-hoc wireless network and communicate with each other directly. Wireless router 220, if configured to operate in infrastructure mode may connect to the computer system 140 wirelessly and may also connect to codec 109 wirelessly, thus connecting the computer system 140 and codec 109 together. Wireless/wired router 220, may, for example, connect to the computer system 140 by a wired connection or by a wireless connection and router 220 may, for example, connect to codec 109 by a wired connection or by a wireless connection. Thus, the computer system 140 and codec 109 may be connected by a combination of wired and wireless connections and they may be connected through router 220. Note that, although FIG. 1 and FIG. 2 both depict computer system 140 and codec 109 as being in the same physical location, in some embodiments, computer system 140 may be located in a different location from codec 109 (e.g., in a different room, in a different building, in a different city, in a different country). Furthermore, computer system 140 may be unfamiliar or unknown to participant 114, and computer system 140 may belong to another individual, organization or corporation. For example, in some embodiments, computer system 140 may take the form of an IP connected appliance/service (e.g., a multimedia web server). In certain embodiments, participant 114 may wish to share video that may be stored on a remote computer system 140 (e.g., on a Flickr™ account) that may, for example, belong to a service provider (e.g., Flickr™, YouTube™, Google Picasa™). In some embodiments, video (e.g., photos, movies, music) may be coded by software (e.g., application software) executing on a computer system 140 (e.g., a remote computer, a remote web server) that may, for example, belong to a service provider, and the coded video may be streamed to codec 109 (e.g., across the Internet, over an intranet, through router 220). Thus, the computer system 140 may be a user's computer system or any IP connected appliance or service, as desired.

In further embodiments, the computer system 140 and the codec 109 may be coupled in other manners or according to other protocols. For example, in one embodiment, the codec 109 may coupled to the computer system 140 via a Bluetooth or IR connection, although other types of connections are possible. In some embodiments, a connection between codec 109 and computer system 140 may be made manually (e.g., in response to an action (e.g., a request, a response, an input, by connecting to a network) from local participant 114, made in response to an action (e.g., a request, a response, an input) made by a remote participant and/or by a videoconferencing facilitator. In other embodiments, a connection between codec 109 and computer system 140 may be established automatically (e.g., on computer system 140 detecting codec 109, or codec 109 detecting computer system 140, by software running on one or both devices). Thus, without the connection may be established by the codec or computer system without a user specifically instructing either to connect.

Figure 3A:
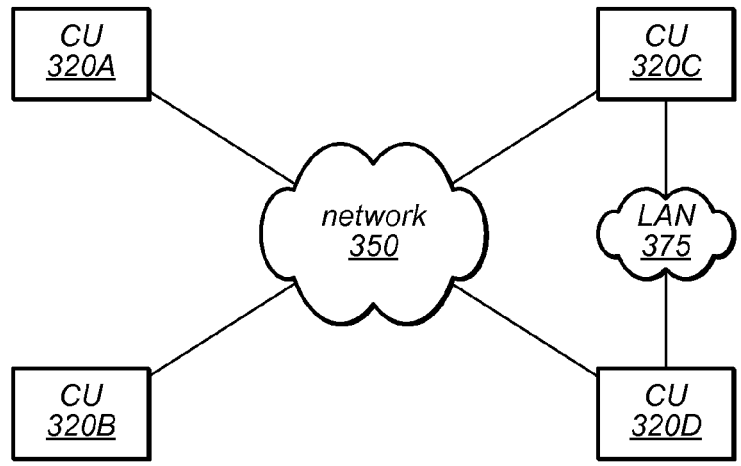
FIGS. 3A and 3B illustrate exemplary conferencing systems coupled in different configurations, according to some embodiments.
Figure 3B:
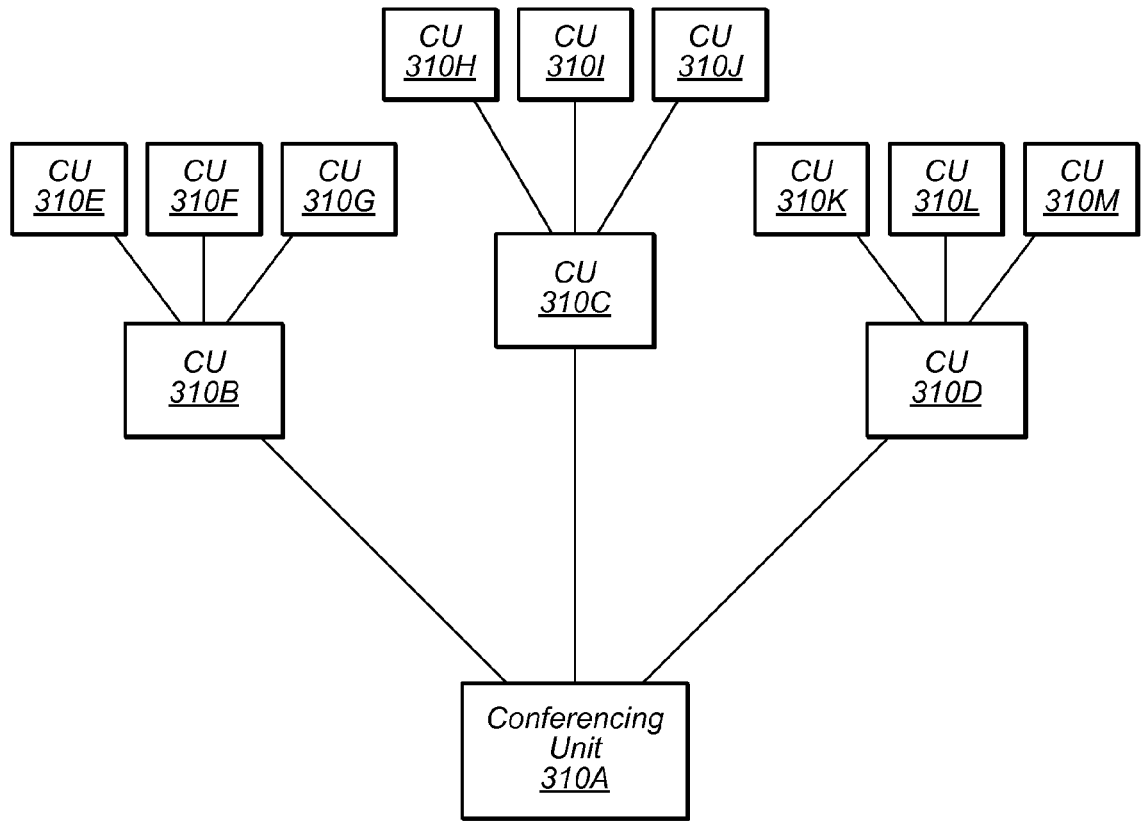

FIGS. 3A and 3B—Exemplary Conferencing Configurations

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
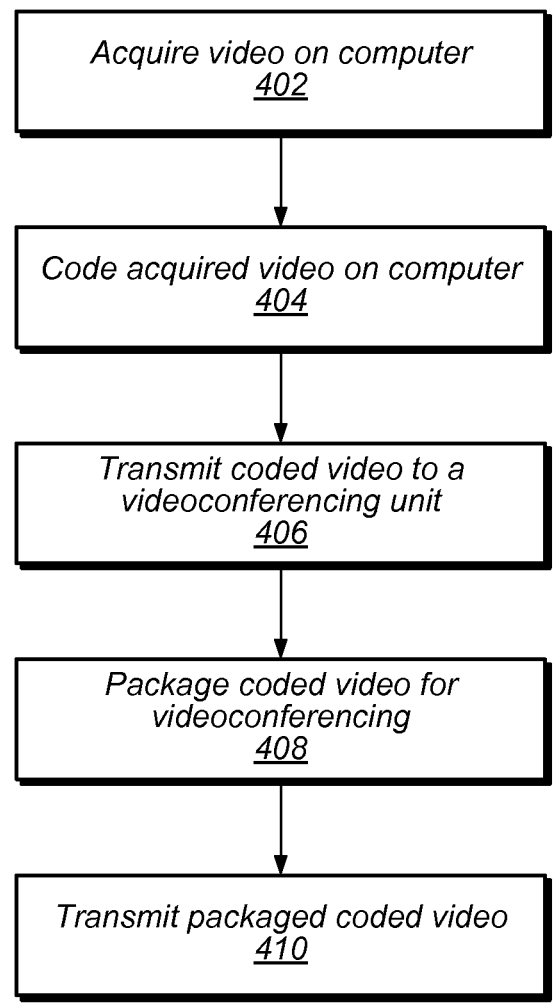
FIG. 4 is a flowchart diagram illustrating an exemplary method for videoconferencing using a computer, according to one or more embodiments.

FIG. 4—Using a Computer for Videoconferencing

FIG. 4 depicts a method (e.g., method 400) of using a computer for videoconferencing according to one or more embodiments. More specifically, FIG. 4 illustrates a method, according to some embodiments, of handling computer system graphical information for videoconferencing. The method shown in FIG. 4 may be used in conjunction with any of the computer systems or devices shown in the above Figures, among other devices. Additionally, while the following method is described with regard to video, it may also apply to one or more images. In various embodiments, some of the method elements shown may be performed concurrently, performed in a different order than shown, or omitted. Additional method elements may also be performed as desired. As shown, this method may operate as follows.

In 402, video may be acquired on a computer (e.g., the computer system 140). In some embodiments, the video may include, for example, a number of images or motion video of various resolutions, frame rates and color depths. The acquired video may relate to, for example, a computer graphical user interface (GUI) desktop (e.g., Windows® desktop), a GUI window, an application window (e.g., a Microsoft PowerPoint® application window), a videoconferencing window. Video may be acquired from various locations. For example, video may be acquired from computer system storage (e.g., system random access memory (RAM), hard disk), graphics RAM, video buffer RAM, from a graphics chip, from a video pipeline. Video may be acquired by software, e.g., freeware, shareware, open-source software, commercial software, dedicated software, software that may be used for various tasks (e.g., VLC). In some embodiments, acquiring video may include acquiring video with specified or desirable characteristics (e.g., size of image, color depth, frame rate) that may be different from the original characteristics of the video. For example, a 640×480 image may be acquired as a 320×240 image.

In further embodiments, instead of acquiring video from a computer application or operating system, the video may be previously stored and may be selected, e.g., by the user, for presentation in the videoconference.

In 404, video may be coded on the computer (e.g., the computer system 140). Coding may involve, for example, image resizing, compressing, encoding, and/or format conversion, and/or digital-to-digital conversion. Coding may also involve coding in a videoconferencing compatible format (e.g., compliant to a media sharing format, ITU-T H.239). In some embodiments, the video may be fully coded or partly coded and coding may be, for example, fully compatible (e.g., 100%) or substantially compatible (e.g., 80%, 90%, or at least greater than 50% compatible) with the videoconferencing configuration and/or videoconferencing standards. Furthermore, in some embodiments, coding video may include, for example, coding video in a manner that is compatible with one or more communications protocols (e.g., a multimedia communications standard protocol). For example, in certain embodiments, coding video may include coding video in a manner that is compatible one of the following protocols: ITU-T H.239, ITU-T H.323, and Session Initiation Protocol (SIP), among other possible communication protocols. The amount of coding performed on the computer and the compatibility of coding performed on the computer may be assessed by examining the amount of coding (e.g., encoding and/or decoding, or other required processing) performed on received coded video by the videoconferencing unit. If the videoconferencing unit performs no coding (or little coding), then the computer may have fully (or substantially) coded the video in a fully compatible (or substantially compatible) fashion. In some embodiments, the coding performed on the computer system may mean, for example, that less coding, or substantially less coding or no coding may be performed on the codec. Coding may be performed by dedicated software, and/or by software (e.g., VLC) that may also be capable of performing other functions (e.g., acquiring video). In some embodiments, coding may include changing the characteristics of the video (e.g., size of image, color depth, frame rate).

In 406, coded video may be transmitted (e.g., streamed) from the computer (e.g., the computer system 140) to the videoconferencing unit (e.g., codec 109). In some embodiments, the coded video may be transmitted over a network (e.g., an IEEE 802.3 Ethernet network, a network supporting TCP/IP). The network may be a wireless network (e.g. conforming to IEEE 802.11n/g) or a wired network (e.g., twisted-pair, co-axial cable, fiber optic). Thus, data may be transmitted from computer to videoconferencing unit over wired and/or wireless connections. For example, in depicted system 200, coded video may be transmitted from the computer system 140 to wireless router 220 via cable 248 and then the coded video may be transmitted from wireless router 220 to videoconferencing codec 109 by an IEEE 802.11g wireless link, although other configurations are envisioned. For example, Coded video may be transmitted across a variety of types of wireless links, including point-to-point links (e.g., a Bluetooth link, an ad-hoc IEEE 802.11 network link) and/or infrastructure links (e.g., links via a wireless router, through a wireless access point). Data may be transmitted (e.g., streamed) from the computer system using custom software, commercial software, freeware, shareware, dedicated software and software capable of performing other functions (e.g., VLC).

In 408, the coded video may be received by the videoconferencing unit (e.g., videoconferencing codec 109) and may be "packaged" for videoconferencing. In some embodiments packaging may include, for example, creating wrappers for the coded video, packetizing the coded video, creating headers for the coded video. If the received coded video is not fully compatible (e.g., less than 100% compatible) with videoconferencing system demands, packaging may involve modifying the coded video to improve compatibility. Packaging the coded video may also involve making the coded video suitable for transmission e.g., over a WAN, over an intranet, over an extranet, over the Internet, etc. In some embodiments, packaging may include the addition of routing information and/or display channel information so that, for example, the video is correctly routed to one or more videoconferencing endpoints and correctly displayed on those endpoints. However, in some embodiments, the computer may properly package the video before providing it to the videoconferencing unit.

Finally, in 410, the packaged video may be transmitted. More specifically, the coded video may be transmitted (e.g., streamed, broadcast) to a single destination or to multiple destinations (e.g., multiple videoconferencing endpoints). Video may, for example, be transmitted across wireless (e.g., IEEE 802.11g/n) and/or wired (e.g., twisted pair, co-axial cable, fiber optic) links, be transmitted through gateways and/or routers and/or firewalls and/or modems, as desired. 410 may include transmitting the coded video across an intranet, an extranet, and/or the Internet. Packaged, coded video may be transmitted from the videoconferencing unit (e.g., codec 109) to another videoconferencing unit directly or indirectly (e.g., through a central videoconferencing unit or MCU), as desired.

Note that while the above described method relates to video of a computer system, the audio of the computer system may be similarly coded and transmitted, e.g., with the video data. Thus, where a presentation or video being provided by the computer includes audio data, the audio data may also be provided in the videoconference.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for sharing computer video in a videoconference, the method comprising:
    storing video on a computer;
    the computer partly coding the video to produce partly coded video; and
    the computer transmitting the partly coded video to a videoconferencing unit, wherein the videoconferencing unit is configured to:
        complete coding of the partly coded video to produce completely coded video, wherein completing coding requires less processing than if the video had not been partly coded by the computer;
        package the completely coded video on the videoconferencing unit to produce videoconferencing data, wherein said packaging the completely coded video comprises making the completely coded video suitable for transmission over a network; and
        transmit the videoconferencing data to one or more videoconferencing endpoints of the videoconference.

2. The method of claim 1, wherein the method further comprises:
    acquiring the video on the computer, wherein said acquiring comprises acquiring a plurality of images provided by a computer application executing on the computer.

3. The method of claim 1, wherein said partly coding the video on the computer comprises coding the video in a manner that is substantially compatible with the videoconference.

4. The method of claim 1, wherein at least one of said partly coding or said completing coding utilizes VideoLan Client (VLC) media player.

5. The method of claim 1, wherein said completing coding comprises coding the video in a manner that is compatible with a communications protocol used by the videoconference.

6. The method of claim 1, wherein said completing coding comprises coding the video in a manner that is compatible with the International Telecommunication Union Telecommunication standard (ITU-T) H.239.

7. The method of claim 1, wherein said completing coding comprises coding the video in a manner that is compatible with the Session Initiation Protocol (SIP).

8. The method of claim 1, wherein said transmitting the partly coded video from the computer to the videoconferencing unit comprises transmitting the partly coded video from the computer to the videoconferencing unit across a peer-to-peer wireless link.

9. The method of claim 1, wherein said transmitting the partly coded video from the computer to the videoconferencing unit comprises transmitting the partly coded video from the computer to the videoconferencing unit via a wireless network.

10. A tangible, computer-accessible memory medium storing program instructions for sharing computer video in a videoconference, wherein the program instructions are executable to:
    acquire video on a computer, wherein said acquiring comprises acquiring a plurality of images provided by a computer application executing on the computer;
    partly code the video to produce partly coded video; and
    transmit the partly coded video from the computer to a videoconferencing unit, wherein the videoconferencing unit is configured to:
        complete coding of the partly coded video to produce completely coded video, wherein completing coding requires less processing than if the video had not been partly coded by the computer;
        package the completely coded video on the videoconferencing unit to produce videoconferencing data, wherein said packaging the completely coded video comprises making the completely coded video suitable for transmission over a network;
        and transmit the videoconferencing data to one or more videoconferencing endpoints of the videoconference.

11. The memory medium of claim 10, wherein said partly coding the video on the computer comprises coding in a manner that is substantially compatible with the videoconference.

12. The memory medium of claim 10, wherein at least one of said partly coding or said completing coding the video utilizes VideoLan Client (VLC) media player.

13. The memory medium of claim 10, wherein said completing coding comprises coding the video in a manner that is compatible with a communications protocol used by the videoconference.

14. A method for sharing computer video in a videoconference, the method comprising:
    a videoconferencing unit receiving partly coded video from a computer, wherein the video was acquired from an application executing on the computer, and wherein the acquired video was partly coded by the computer;
    completing coding of the partly coded video to produce completely coded video, wherein said completing coding requires less processing than if the video had not been partly coded by the computer;
    packaging the completely coded video on the videoconferencing unit to produce videoconferencing data, wherein said packaging the completely coded video comprises making the completely coded video suitable for transmission over a network; and
    transmitting the videoconferencing data to one or more videoconferencing endpoints of the videoconference.

15. The method of claim 14, wherein the received partly coded video is substantially compatible with the videoconference.

16. The method of claim 14, wherein said receiving the partly coded video from the computer is performed across a peer-to-peer wireless link.

17. The method of claim 14, wherein said receiving the partly coded video from the computer is performed across a wireless network.

18. A tangible, computer-accessible memory medium storing program instructions for sharing computer video in a videoconference, wherein the program instructions are executable to:
    receive partly coded video from a computer, wherein the video was partly coded by the computer;
    complete coding of the partly coded video to produce completely coded video, wherein said completing coding requires less processing than if the video had not been partly coded by the computer;
    package the completely coded video to produce videoconferencing data, wherein said packaging the completely coded video comprises making the completely coded video suitable for transmission over a network; and
    transmit the videoconferencing data to one or more videoconferencing endpoints of the videoconference.

19. The memory medium of claim 18, wherein the video was acquired from an application executing on the computer.

20. The memory medium of claim 18, wherein the received partly coded video is substantially compatible with the videoconference.

* * * * *

UNITED STATES PATENT AND TRADEMARK OFFICE
CERTIFICATE OF CORRECTION

PATENT NO. : 8,558,862 B2  
APPLICATION NO. : 12/890177  
DATED : October 15, 2013  
INVENTOR(S) : Kulkarni et al.

Page 1 of 1

It is certified that error appears in the above-identified patent and that said Letters Patent is hereby corrected as shown below:

In the Claims:

Claim 12, Column 12, Line 20, please delete "coding the video" and substitute -- coding --.

Signed and Sealed this  
Seventeenth Day of December, 2013

Margaret A. Focarino  
*Commissioner for Patents of the United States Patent and Trademark Office*